US005482694A

United States Patent [19]
Jara et al.

[11] Patent Number: 5,482,694
[45] Date of Patent: Jan. 9, 1996

[54] REGENERATION OF CYANIDE BY OXIDATION OF THIOCYANATE

[75] Inventors: Javier Jara, Montreal; Heriban Soto; Fabiola Nava, both of Metallurgy, all of Canada

[73] Assignee: Canadian Liquid Air Ltd.-Air Liquide Canada Ltee., Quebec, Canada

[21] Appl. No.: 293,170

[22] Filed: Aug. 19, 1994

[51] Int. Cl.⁶ .................................................. C01C 3/00
[52] U.S. Cl. .......................... 423/364; 423/377; 204/110; 204/DIG. 13; 210/760
[58] Field of Search .................................. 204/110, 127, 204/DIG. 13; 210/760; 423/377, 364

[56] References Cited

U.S. PATENT DOCUMENTS

| | | | |
|---|---|---|---|
| 2,795,544 | 6/1957 | Williams | 210/760 |
| 4,024,037 | 5/1977 | Bishop et al. | 204/149 |
| 4,250,030 | 2/1981 | Kuit et al. | 210/684 |
| 4,312,760 | 1/1982 | Neville | 210/724 |
| 4,537,686 | 8/1985 | Borbely | 210/713 |
| 4,615,873 | 10/1986 | Devuyst et al. | 423/367 |
| 5,169,615 | 12/1992 | Jennings | 423/377 |
| 5,364,605 | 11/1994 | Pfeffer | 423/236 |

*Primary Examiner*—John Niebling
*Assistant Examiner*—Brendan Mee
*Attorney, Agent, or Firm*—Burns, Doane, Swecker & Mathis

[57] ABSTRACT

Provided is a method for regenerating cyanide from thiocyanate. The method comprises contacting the thiocyanate with an oxidizing gas containing ozone, generally a mixture of oxygen and ozone. The pH of the contacting medium is generally less than 7.0 to assure that HCN is the predominant species relative to CN⁻. The method has important applications to processes involving cyanidation procedures, such as gold leaching, plating and coal conversion.

33 Claims, 6 Drawing Sheets

REGENERATION OF CYANIDE BY OXIDATION OF THIOCYANATE

BACKGROUND OF THE INVENTION

The present invention relates to a process for the effective regeneration of cyanide through the oxidation of thiocyanate. More particularly, the present invention relates to the use of ozone to oxidize thiocyanate and regenerate free cyanide for subsequent use. Such a process is particularly useful in the treatment of CN tailings.

Cyanide is used in a variety of industrial processes that are carried out in aqueous media, such as the recovery of gold from ore, electroplating, and the conversion of domestic coal to coke, gasoline and gaseous fuels. Many gold mining operations use cyanide solutions to leach gold from the ore. Cyanide consumption is one of the main components of the total operating cost of a plant. However, most of the cyanide added to a slurry is actually wasted. According to the theoretical stoichiometry, to dissolve the gold contained in a typical ore, just 3 to 4 grams of cyanide per ton should be consumed. In practice, typical consumptions range from about 300 g/t to some 2000 g/t or even more. The extra cyanide consumption is partially accounted for by the formation of volatile HCN and by oxidation to cyanate, but the biggest loss occurs through the formation of cyanide complexes (copper, iron and zinc) and of thiocyanate. According to some reports, cyanide loss through thiocyanate may account for up to 50% of the total cyanide consumption. In fact, in all of the aforementioned industrial processes, a wastewater is generally created which contains a large concentration of thiocyanate.

Thiocyanate concentration in mill effluent varies widely depending on the type of ore and operating conditions. A normal range would be 40 mg/l to 600 mg/l, but it may reach up to nearly 2000 mg/l in the barren bleed of certain Merrill-Crowe operations. The exact mechanism of thiocyanate formation during cyanidation is not clear. It is believed that thiocyanate results from the reaction of the cyanide ion or its metallic complexes with sulfur atoms originated from the attack of alkalies on reactive sulfides such as pyrrhotite. Sulfur atoms can also form by the oxidation of sulfide ions released by dissolution of sulfide minerals. Thiosulfate and polythionate species may also contribute to thiocyanate formation.

Thiocyanate is considered to be non-toxic and its concentration in mining effluent is not regulated at the present time. However, it is known that ultraviolet light decomposes thiocyanate to form cyanide, it is then possible that sunlight may liberate cyanide levels toxic to aquatic life from effluent rich in thiocyanate. In view of these considerations, it is not unlikely that in the future some limit may be imposed on the concentration of thiocyanate in effluent.

Among the leading processes currently being applied to the detoxification of a cyanidation effluent are processes based on the oxidation of cyanide with hydrogen peroxide or with $SO_2$-air mixtures. See, for example, U.S. Pat. No. 5,178,775. Other typical processes for removing cyanide from aqueous streams are described in U.S. Pat. Nos. 4,537,686; 5,015,396; and 5,290,455. None of the current oxidants used, however, are strong enough to decompose thiocyanate.

In order to destroy thiocyanate, more powerful reagents such as ozone or chlorine are required. Chlorine, however, may produce toxic derivatives and its use in the mining industry as well as other industries is questionable. On the other hand ozone is a less problematic reagent. At present, ozone is widely applied in water treatment and it is increasingly used instead of chlorine as a bleaching agent in the pulp and paper industry. The use of ozone to destroy cyanide in a mining effluent has received some attention. See, for example, M. D. Durol and T. E. Holden, "The Effect of Copper and Iron Complexation on Removal of Cyanide by Ozone." Ind. Eng. Chem. Res., vol. 27, No. 7. 1988, pp. 1157–1162, and *Treatment of Acid Ming Drainage by Ozone Oxidation*, Department of Applied Science, Brookhaven National Laboratory, Associated Universities, Inc., prepared for the Environmental Protection Agency, December, 1970. However, the economics of the process has not been demonstrated.

Little information has been published regarding the reaction of thiocyanate with ozone. It is known that the reaction occurs in two steps, the first one involving the oxidation of thiocyanate to cyanide, with the second involving further oxidation to cyanate, according to the following equations.

$$SCN^- + 2O_3 + 2OH^- \rightarrow CN^- + SO_4^{2-} + H_2O + 3/2 O_2 \quad (1)$$

$$CN^- + O_3 \rightarrow CNO^- + O_2 \quad (2)$$

Both reactions are fast and are probably mass transfer controlled. According to these equations, regeneration of cyanide from thiocyanate would be difficult due to the subsequent oxidation of the cyanide formed. Nevertheless, the ability to successfully regenerate cyanide from thiocyanate would be of great value to the industry as cyanide regeneration seems more attractive than straight thiocyanate destruction. Cyanide regeneration would require less oxidizing agent and it would also reduce overall cyanide consumption.

Accordingly, it is an object of the present invention to provide a process for the controlled oxidation of thiocyanate to regenerate cyanide.

Another object of the present invention is to provide a process for the effective and efficient oxidation of thiocyanate to recover cyanide from cyanidation effluents.

Another object of the present invention is to successfully apply such a recovery process to effluents created in gold mining, electroplating and in coal conversion.

These and other objects of the present invention will become apparent upon a review of the following specification and the claims appended thereto.

SUMMARY OF THE INVENTION

In accordance with the foregoing objectives, there is provided an economical and effective method for regenerating cyanide from thiocyanate. The method comprises contacting the thiocyanate, in solution or a slurry, with an oxidizing gas containing ozone. The pH of the thiocyanate contacting medium is preferably sufficiently low to assure that HCN is the predominant species in the medium relative to $CN^-$. Generally, the pH is less than 7.0, i.e., acidic, during the contacting. For it has been found that regeneration of cyanide from thiocyanate is possible where the pH of the solution or slurry approaches the acidic region, and is preferably below 7.0, and more preferably below 6.0. Cyanide recoveries of up to at least 90% of theoretical maximum have been obtained with a consumption of about 1.2 Kg ozone per Kg of thiocyanate.

In another embodiment, the method of the present invention can be applied in the treatment of cyanidation effluent, and in particular, effluents originating from the recovery of gold from ores. Metals such as copper which are often found in such effluents can interfere with the method of the present invention if the concentration is too great, e.g., greater than 10 mg/l. However, if the effluent contains an excessive amount of copper, the amount can be reduced to below the acceptable level of 10 mg/l by simple oxidation with hydrogen peroxide prior to contacting with the oxidizing gas containing ozone.

DETAILED DESCRIPTION OF THE PREFERRED EMBODIMENTS

The present invention provides a process to generate cyanide from thiocyanate by controlled oxidation with ozone. The main difficulty of such an approach is that ozone is a powerful oxidizing agent that destroys cyanide and cyanide complexes at a very fast rate, thus cyanide formed by the oxidation of thiocyanate would be in turn oxidized, unless some mechanism was found to stop or at least to slow the cyanide oxidation reaction. The present invention provides such a mechanism, as it was discovered that the oxidation of cyanide by ozone is pH dependant.

Figure 1:
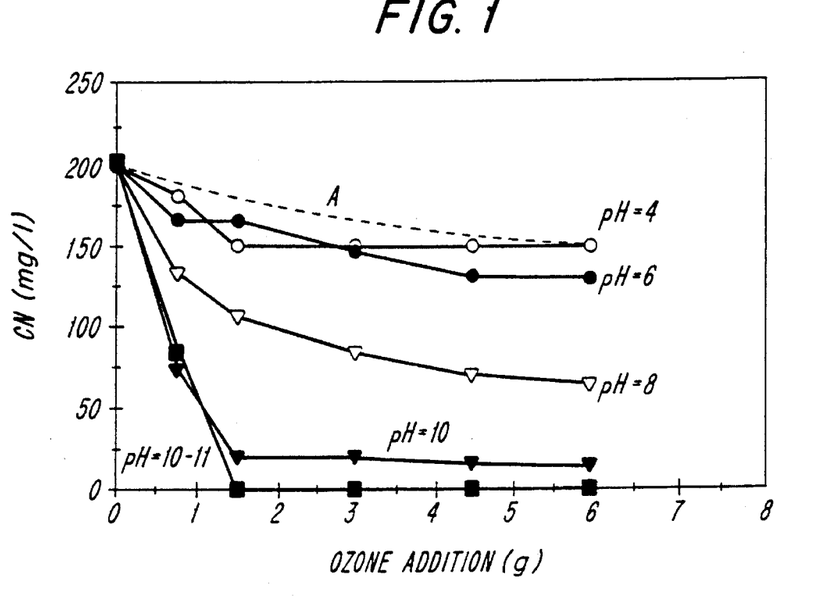
FIG. 1 graphically depicts the effect of pH on free cyanide oxidation with ozone.

As seen in FIG. 1, free cyanide (i.e. the sum of HCN plus $CN^-$) is not destroyed by ozone at acidic pH values. This might be explained in terms of the hydrolysis of cyanide ions, i.e. ozone oxidizes cyanide ions but it is not capable of oxidizing the acid form, HCN. Thus at low pH values, when the concentration of $CN^-$ is very small, cyanide destruction practically stops. The small decrease in free cyanide observed at pH 4 and 6, is largely due to volatilization of HCN as demonstrated by control tests carried out with nitrogen instead of ozone (see, curve A in FIG. 1).

Figure 2:
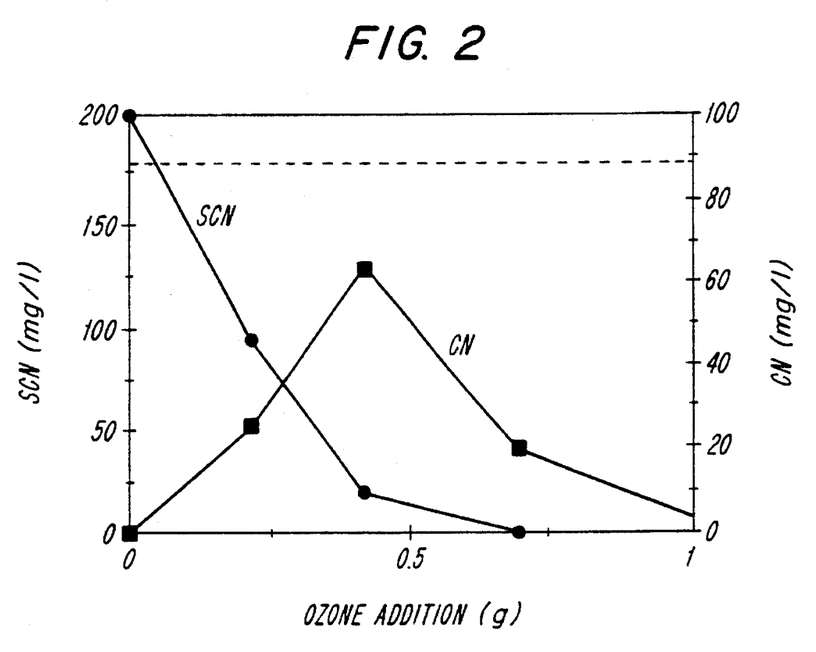
FIG. 2 graphically depicts the results of oxidation of a pure thiocyanate solution at pH=12.
Figure 3:
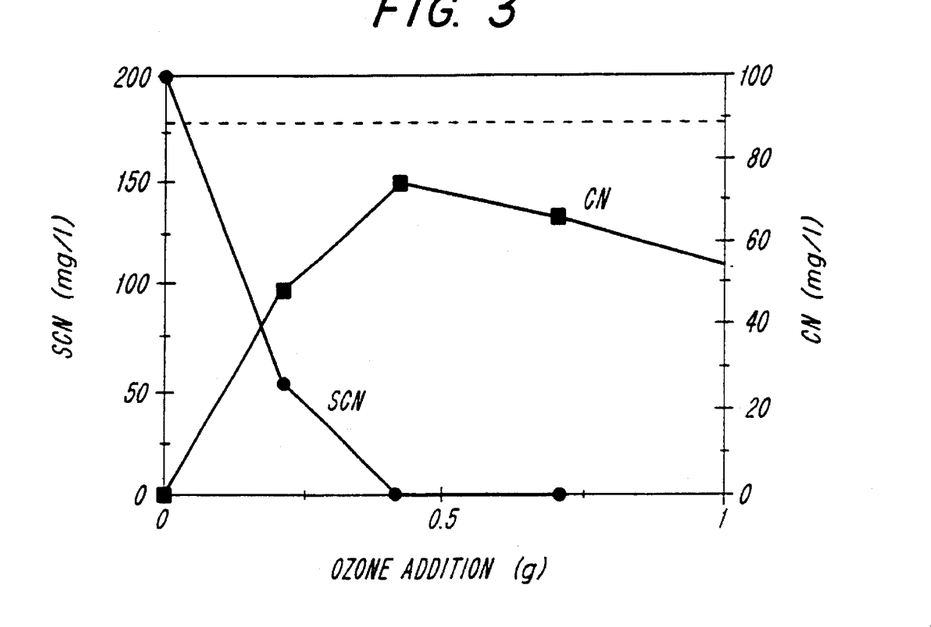
FIG. 3 graphically depicts the results of ozonation of a pure thiocyanate solution at pH=3.

On the other hand, as shown in FIGS. 2 and 3 of the Drawing, thiocyanate oxidation takes place both in alkaline and acidic conditions. This indicates that thiocyanate oxidation is pH independent at least in the range of pH 3 to 12. This difference in behavior between cyanate and thiocyanate may be explained by the very low pKa of HSCN, which is about 1.0. FIGS. 2 and 3 show that when a pure thiocyanate solution is treated with ozone at pH values lower than 6, it yields a high conversion rate of thiocyanate into cyanide. On the other hand, at alkaline pH values the conversion rate is lower and a prolonged ozone addition can destroy all of the cyanide formed. Ozone oxidation of thiocyanate yields sulfuric acid as a by-product, the presence of this acid normally lowers the pH of the solution to a value adequate for cyanide regeneration. A thiocyanate conversion of about 90% has been obtained with an ozone addition on the order of 1.2 g/g, equivalent to 70% of the stoichiometric amount indicated by Eq. 1.

Therefore, the method of the present invention is based at least in part on the discovery that when the pH is maintained at lower values, preferably acidic, below 7.0, cyanide is not destroyed by ozone. The method in its simplest form involves contacting a thiocyanate solution with an ozone containing oxidizing gas with the pH of the contacting medium being maintained sufficiently low to assure HCN is the predominant species in the medium relative to $CN^-$. Generally, it is sufficient and preferred to maintain the pH value below 7.0, more preferably below 6.0, and most preferably below 5.0.

The method of the present invention for regenerating cyanide from thiocyanate comprises contacting the thiocyanate with an oxidizing gas containing ozone. The thiocyanate is generally in solution or a slurry, and the contacting medium has a pH sufficiently low to assure HCN as the predominant species in the medium relative to $CN^-$. While the pH of the medium does not have to start at such a low pH value, the contacting should predominantly occur at such a low pH to avoid cyanide destruction by the ozone and hence maximize the conversion of the thiocyanate to cyanide. It is preferred that the pH of the contacting medium is acidic, i.e., pH less than 7.0. More preferably, the pH is less than 6.0.

The oxidizing gas used in the contacting contains ozone, and is preferably a mixture of ozone and oxygen. Such mixtures can be generated by an ozone generator directly on site, if desired. The mixture generated will generally contain from about 3.0 to about 15 wt % ozone.

The ozone containing gas can be passed into the thiocyanate solution or slurry in order to effect the contacting using any conventional gas/liquid contacting scheme. Generally, the gas will be bubbled through the solution or slurry. Any oxygen in the gas mixture can be recovered and reused.

The oxidation of thiocyanate with ozone results in free cyanide. Under acidic conditions, the $CN^-$ ion is converted to HCN. In order to recover the free cyanide, the HCN can be easily converted to free cyanide by raising the pH of the medium to a basic pH, more preferably greater than 10, and most preferably greater than 11 or 12. The pH can be raised, for example, by adding lime (CaO) to the reaction medium. Lime is most preferred for such a practice due to its availability and effectiveness.

Once the free cyanide has been regenerated, the effluent containing the cyanide can be used, e.g., recycled, in cyanidation processes. Such processes would include the recovery of gold from ore, electroplating and coal conversion. The incorporation of the method of the present invention into such processes would greatly improve the economics and environmental acceptability of such processes. To regenerate cyanide from thiocyanate in accordance with the present invention requires less oxidizing agent than straight thiocyanate destruction. Moreover, the ability to regenerate cyanide greatly reduces the overall cyanide consumption.

Figure 4:
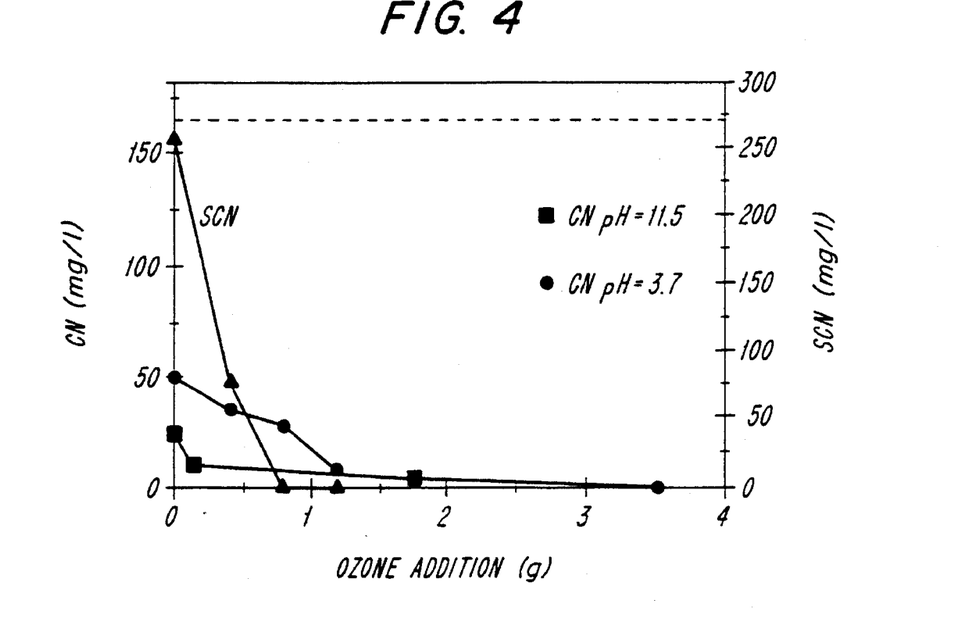
FIG. 4 graphically depicts the results of the ozonation of industrial effluent.

Problems with industrial effluents, however, can occur due to the presence of copper. For example, a typical industrial solution containing 260 mg/l thiocyanate, 14 mg/l free cyanide and 57 mg/l copper did not show cyanide conversion upon the addition of ozone. Upon ozone addition, all of the thiocyanate was destroyed, the concentration of free cyanide did not increase, it actually decreased (see FIG. 4.)

The reason for this behavior is believed to be the presence in the effluent of catalysts of the cyanide oxidation reaction. Industrial solutions normally contain a variable amount of copper and other metallic ions that can act as catalysts for cyanide oxidation. Furthermore, some of the processes used to destroy cyanide in mill effluent may actually add copper if the natural concentration of the metal is too low to accelerate the oxidation of cyanide.

Figure 5:
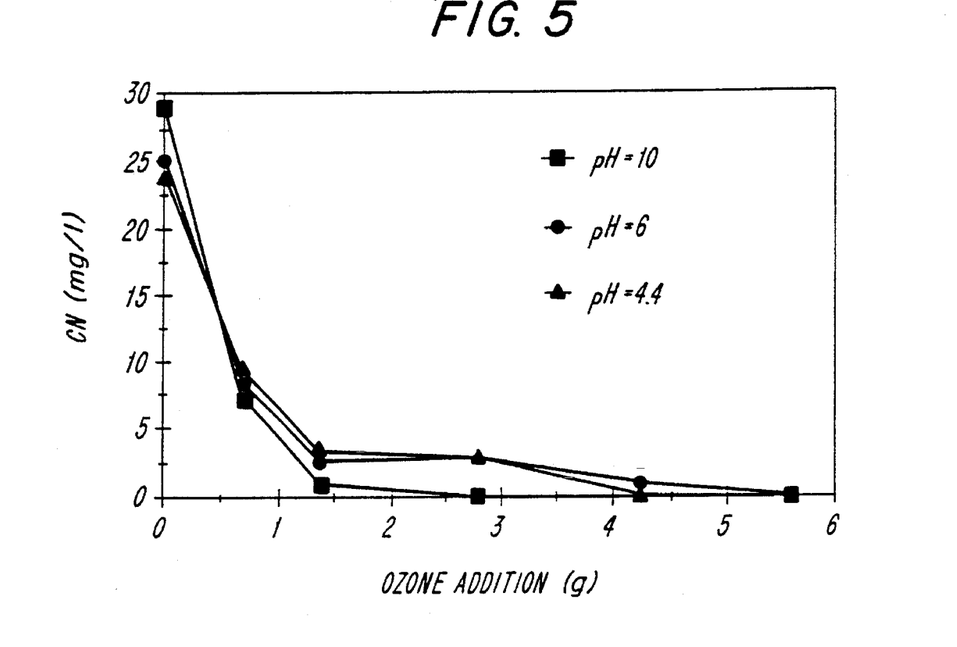
FIG. 5 graphically depicts the effect of pH on copper cyanide oxidation.

The effect of copper on ozone oxidation of cyanide is shown in FIG. 5. This Figure indicates that if there is copper in solution (i.e. cyanide is present in the form of copper cyanide complexes) cyanide is oxidized by ozone at acid pH as well as alkaline pH values (in a pH range 4.0 to 12.0).

Figure 6:
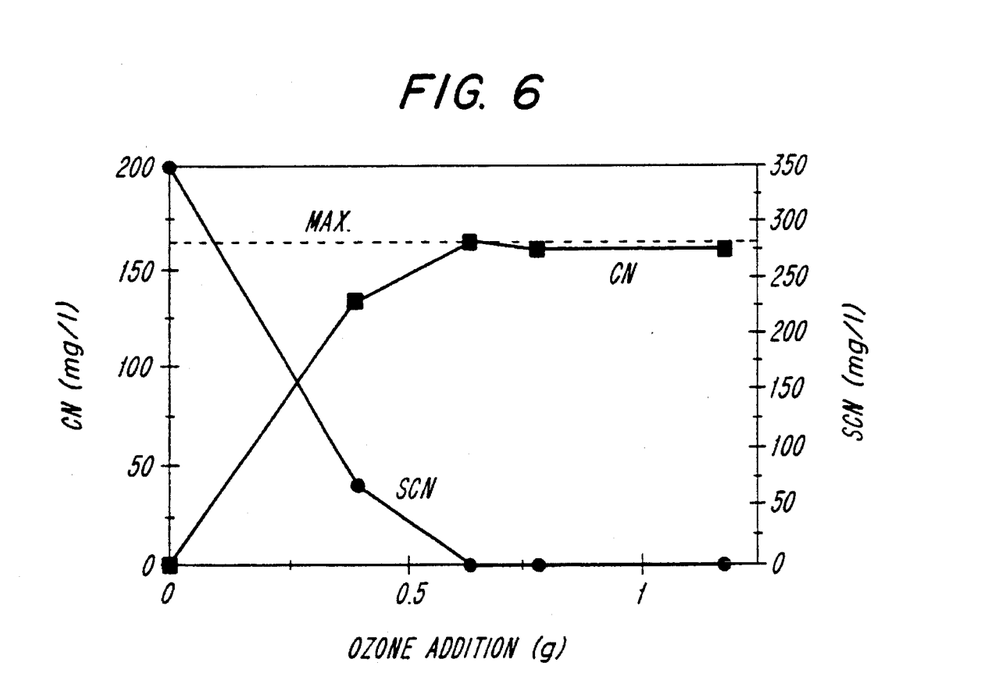
FIG. 6 graphically depicts the results of the ozonation on an effluent previously treated with 0.7 ml hydrogen peroxide/l solution.

This represents a problem for cyanide regeneration in industrial effluent where copper is normally found in relatively high concentrations. However, we have discovered that if a selective oxidant such as hydrogen peroxide is used to destroy the copper cyanide complexes, cyanide can still be regenerated from thiocyanate. As seen in FIG. 6, when the copper complexes are first destroyed with peroxide, and afterwards the solution is oxidized with ozone, a thiocyanate conversion rate similar to that of a pure thiocyanate solution is obtained.

In another embodiment, ferrous or ferric cyanide can be added to cyanidation tailings. This addition is then followed by the addition of ferrous sulfate in order to lower the copper concentration, and remove any iron cyanide.

The elimination Of the copper complexes needs not be thorough, as maximum thiocyanate conversion rates are achievable when copper is reduced just below around 10 mg/l. The data in FIG. 6 was obtained when the copper concentration was reduced to 0.81 mg/l, but similar conversion rates were obtained with a copper concentration as high as 12 mg/l. This type of copper concentration would be easily attainable without peroxide, simply by natural degradation of the cyanide (although this may result in a simultaneous decrease in thiocyanate concentration). The relatively high concentration of copper permissible for thiocyanate regeneration is a significant advantage for the application of the present method in regenerating and recycling cyanide as compared to direct discharging of the effluent to the environment. This last option would require a reduction in copper concentration in the effluent to below 0.3 mg/l.

The invention will be illustrated in greater detail by the following specific examples. It is understood that these examples are given by way of illustration and are not meant to limit the disclosure of the claims to follow. All percentages in the examples, and elsewhere in the specification, are by weight unless otherwise specified.

In the following experiments, the experimental set up shown in FIG. 7 was used to study the destruction of cyanide in different types of solutions. It essentially consists of an ozone generator (Griffin GTC-2B), a column reactor provided with a porous stainless steel sparger, and an ozone detector (Griffin EF-2001-HC). Some of the experiments were conducted in a batch mode by filling the column with 3 to 5 liters of cyanide solution and then bubbling ozone for a given period of time. All tests were performed at room temperature. Ozone was continuously analyzed in the exit gas while the solution was monitored by determining the pH, Eh and cyanide content. Since the gas picked up humidity from the solution, before entering the ozone monitor the gas was dried by cooling with alcohol at −5° C. The cyanide solution was continuously circulated counter current to the gas flow by means of a pump. The ozone generator was fed with oxygen and the concentration of ozone produced was controlled by the current intensity and by the flow rate of oxygen.

The same set up was also used in Example 3, except in continuous fashion. In this case, the solution was pumped directly from the tailings pond to the ozonation column and then back to the pond. To keep a constant solution level inside the column the feeding pump was controlled with a conductivity type automatic level detector.

Thiocyanate was analyzed calorimetrically according to the ASTM standard method, and cyanide was determined with a specific electrode or by titration with silver nitrate.

EXAMPLE 1

Figure 7:
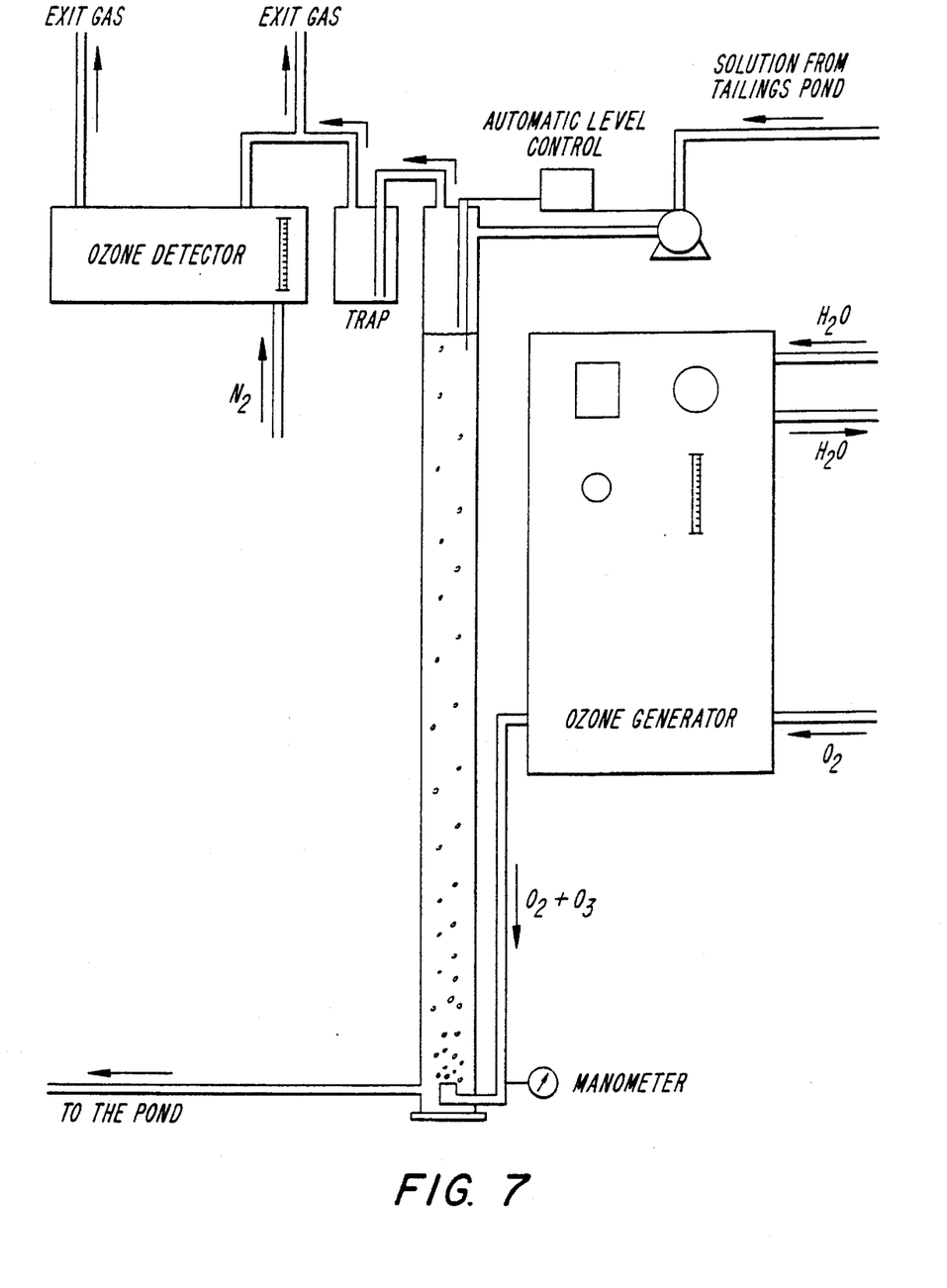
FIG. 7 depicts thiocyanate conversion to free cyanide relative to ozone addition.
Figure 8:
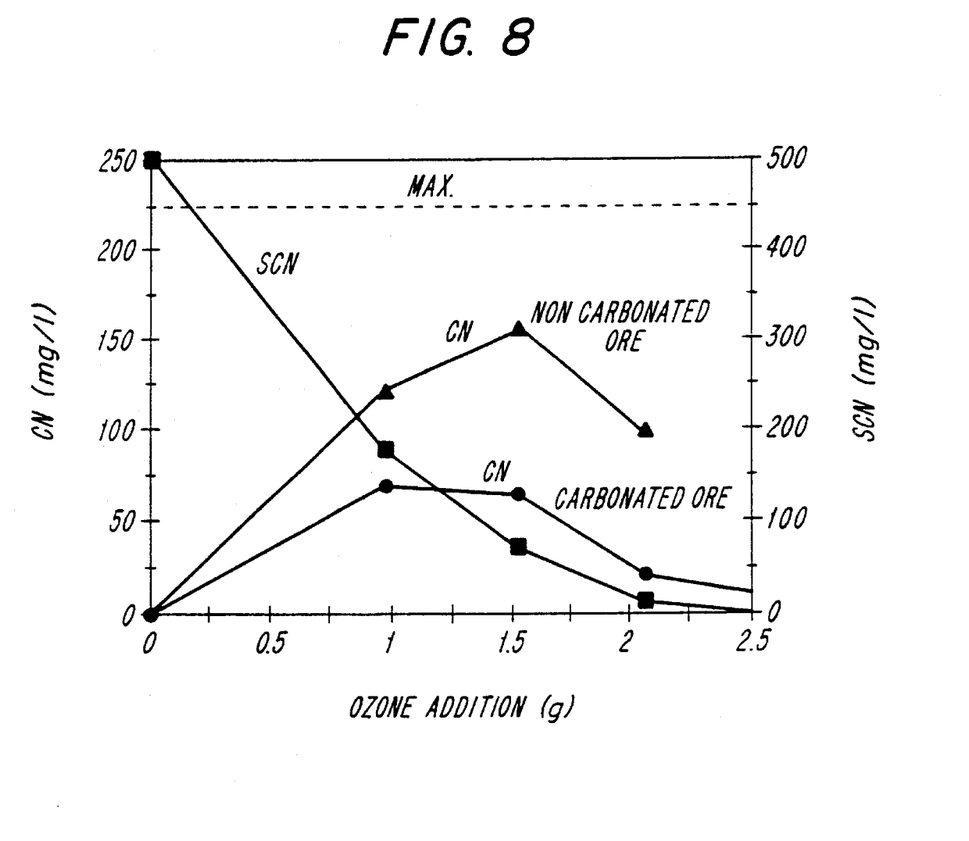
FIG. 8 graphically depicts the effects of the ozonation of thiocyanate in slurries.

Using the experimental set up of FIG. 7, attempts were made to transform thiocyanate into cyanide directly in mineral slurries. Two different ores were employed to prepare slurries that contained 500 mg/l thiocyanate. Ozone was added via the ozone generator over a period of time of from 15 to about 20 minutes. The pH of the solution, the amount of thiocyanate and cyanide in solution and the amount of ozone added were all monitored, and are tabulated in Tables 1 and 2 below. The data is also graphically depicted in FIG. 8.

TABLE 1

| | Carbonated Ore | | | |
|---|---|---|---|---|
| Ozonation time (min) | $O_3$ addition (g) | pH | SCN (ppm) | CN (ppm) |
| 0 | 0 | 7.70 | 500 | |
| 1 | 0.138 | 7.66 | | |
| 2 | 0.275 | 7.43 | | |
| 3 | 0.413 | 7.31 | | |
| 4 | 0.551 | 7.17 | | |
| 5 | 0.689 | 7.10 | | |
| 6 | 0.826 | 7.05 | | |
| 7.5 | 1.033 | 6.99 | 175 | 68 |
| 9 | 1.239 | 6.93 | | |
| 10 | 1.377 | 6.94 | | |
| 11.25 | 1.549 | 6.94 | 70 | 64 |
| 13 | 1.790 | 6.93 | | |
| 14 | 1.928 | 6.95 | | |
| 15 | 2.066 | 6.95 | 10 | 20 |
| 16 | 2.203 | 6.98 | | |
| 17 | 2.341 | 7.16 | | |
| 18.75 | 2.582 | 7.31 | 0 | 8 |

TABLE 2

| | Low Carbonate | | | | |
|---|---|---|---|---|---|
| Ozonation time (min) | $O_3$ addition (g) | Redox potential (mV) | pH | SCN (ppm) | CN (ppm) |
| 0 | 0 | 208 | 5.03 | 525 | 0 |
| 1 | 0.138 | 290 | 4.62 | | |
| 2 | 0.275 | 356 | 4.28 | | |
| | 0.413 | 365 | 4.20 | | |
| 4 | 0.551 | 375 | 4.09 | | |
| 5 | 0.689 | 386 | 4.01 | | |
| 6 | 0.826 | 394 | 3.90 | | |
| 7 | 0.964 | 401 | 3.81 | 175 | 120 |
| 8 | 1.102 | 403 | 3.78 | | |
| 9 | 1.239 | 411 | 3.70 | | |
| 10 | 1.377 | 415 | 3.66 | | |
| 11 | 1.515 | 420 | 3.65 | 50 | 156 |
| 12 | 1.652 | 426 | 3.68 | | |
| 13 | 1.790 | 438 | 3.73 | | |
| 14 | 1.928 | 441 | 3.81 | | |

TABLE 2-continued

| | Low Carbonate | | | | |
|---|---|---|---|---|---|
| Ozonation time (min) | O$_3$ addition (g) | Redox potential (mV) | pH | SCN (ppm) | CN (ppm) |
| 15 | 2.066 | | | 35 | 94 |

The first ore contained plenty of carbonates and therefore the pH of the slurry remained alkaline even after all of the thiocyanate was oxidized. As could be expected in this case, the rate of cyanide conversion was lower, about 30%. The other ore contained no carbonates, so that pH of the slurry during oxidation decreased from 5.0 at the beginning to below 4.0 at the point of highest conversion that was about 70%. See FIG. 8. This demonstrates that under favorable conditions, cyanide generation could be performed directly in a slurry, as well as a solution. It also demonstrates the importance of maintaining the pH acidic in order to achieve good cyanide generation.

EXAMPLE 2

The same set-up as in Example 1 was used. Two oxidation tests with a rate of ozone addition of 0.45 g O$_3$/min, 3.82% O$_3$, injected in 3 L of 200 ppm SCN synthetic solution were performed in a 5 L reactor column. Tables 3 and 4 below show the kinetics of oxidation for two initial pH values: 10 and 3.3 respectively.

TABLE 3

Oxidation of SCN⁻ to CN⁻ using ozone: initial pH = 10

| Time (min) | pH | Potential (mv) | O3 out (%) | Free CN (ppm) |
|---|---|---|---|---|
| 0 | 10.0 | 127 | 0.0 | <1 |
| 1.1 | 2.23 | 300 | 1.14 | 52 |
| 2.2 | 2.13 | 302 | 2.02 | 63 |
| 3.0 | 2.01 | 589 | 3.11 | |
| 4.4 | 2.01 | 1120 | 3.52 | 58 |
| 5.0 | 2.01 | 1166 | 3.79 | |
| 6.6 | 2.00 | 1182 | 3.80 | 56 |

TABLE 4

Oxidation of SCN⁻ to CN⁻ using ozone: initial pH = 3.3.

| Time (min) | pH | Potential (mv) | O3 out (%) | Free CN (ppm) |
|---|---|---|---|---|
| 0 | 3.3 | 450 | 0.00 | 1.2 |
| 0.5 | 2.35 | 327 | 0.07 | |
| 1.1 | 2.17 | 312 | 0.24 | 63.0 |
| 2.2 | 2.00 | 302 | 1.73 | 70.0 |
| 3.0 | 1.93 | 686 | 3.02 | |
| 3.5 | 1.93 | 1098 | 3.49 | |
| 4.0 | 1.93 | 1150 | 3.68 | |
| 4.4 | 1.92 | 1167 | 3.78 | 68.0 |
| 6.6 | 1.93 | 1185 | 3.80 | 50.0 |

Based on the free cyanide assays, potential readings and ozone concentration at the outlet, the conversion of thiocyanate to free cyanide is obtained after 2 min with an ozone consumption of about 1.6 g/g SCN: The initial pH does not influence the rate of SCN⁻ conversion.

Example 3

An industrial solution of 1.75 L with 290 ppm SCN⁻ and 60 ppm Cu was treated with ozone with a rate of 0.088 g/min. Thiocyanate conversion of 98% was achieved in 6.25 min with 1.1 g O3/g SCN. Upon increasing the pH to 10 with the addition of lime, the free cyanide recovery was 78.4%.

Example 4

Figure 9:
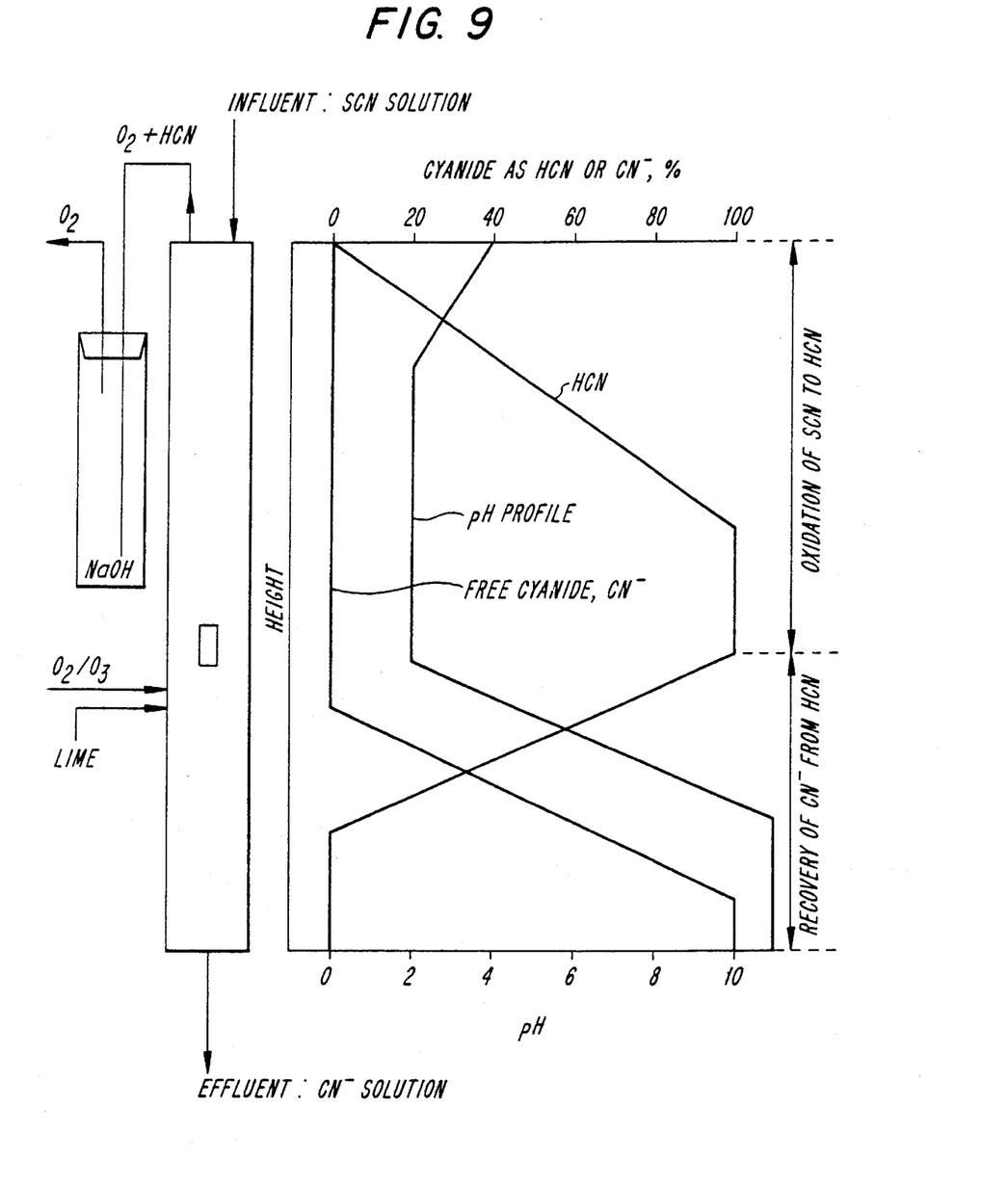
FIG. 9 shows a column reactor useful in the practice of the present invention, together with a graphical presentation of concentrations.

FIG. 9 depicts a preferred embodiment of the present invention in the use of a column reactor and the use of a trap to capture HCN gas and separate out O$_2$ gas for recycle. The figure also depicts a graph of concentration which correspond to the column reactor.

The influent to the column reactor contains high concentrations of SCN⁻, and is introduced at the top of the column. Ozone is injected into the middle of the column, where thiocyanate is oxidized to HCN with the production of sulfuric acid, according to the following reaction:

$$SCN^- + 2O_3 + 2OH^- \rightarrow CN^- + SO_4^{2-} + 3/2\ O_2 + H_2O$$

In the presence of sulfuric acid, the CN⁻ is converted to HCN, which dissolves in the aqueous solution. The HCN gas which does not dissolve is captured in the NaOH solution at the top of the column. The free O$_2$ is also separated from the HCN gas using the NaOH solution, which O$_2$ can then be recycled for use in the procedure, particularly in gold cyanidation.

Below the ozone injection, the conversion of the SCN⁻ to HCN is completed. To transform HCN to CN⁻ the pH of the solution is increased to 11 by adding lime (CaO). The effluent from the bottom of the column, which has a pH of 11, can then be recycled to the gold leaching process.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A method of producing cyanide (CN⁻) from a composition comprising thiocyanate comprising contacting the composition with an oxidizing gas containing ozone while the pH of the composition is sufficiently low to assure HCN as the predominant species in the composition relative to CN⁻, and wherein the pH of the composition resulting from the oxidizing gas contacting step is raised to a pH above 7.0 to convert the HCN to CN⁻.

2. The method of claim 1, wherein the pH of the composition during contact with the oxidizing gas is less than 7.0.

3. The method of claim 1, wherein the composition is a solution.

4. The method of claim 3, wherein the solution is comprised of an effluent from a cyanidation process.

5. The method of claim 4, wherein the cyanidation process involves gold leaching, electroplating or coal conversion.

6. The method of claim 5, wherein the cyanidation process involves the recovery of gold from ore.

7. The method of claim 1, wherein the composition is a slurry.

8. The method of claim 1, wherein the oxidizing gas comprises a mixture of oxygen and ozone.

9. The method of claim 8, wherein oxygen is recovered after the contacting and recycled to a cyanidation process.

10. The method of claim 1, wherein the copper concentration in the composition is lower than 10 mg/l.

11. The method of claim 1, wherein the oxidizing gas containing ozone comprises from about 3.0 to about 15 wt % ozone.

12. The method of claim 1, wherein the pH of the composition during contact with the oxidizing gas is less than 6.0.

13. The method of claim 1, wherein the oxidizing gas containing ozone is generated on site.

14. The method of claim 1, wherein the contacting of the composition with the oxidizing gas takes place for a sufficient length of time to achieve at least about 80% thiocyanate conversion to hydrogen cyanide.

15. The method of claim 1, wherein the contacting of the composition with the oxidizing gas takes place for a sufficient length of time to achieve at least about 90% thiocyanate conversion to hydrogen cyanide.

16. The method of claim 1, wherein the composition resulting from the method is recycled to a cyanidation process.

17. The method of claim 1, wherein the pH is raised to at least a pH of 10.0.

18. The method of claim 1, wherein the pH is raised by adding lime (CaO) to the solution.

19. A method for recovering gold from ore, which comprises
   (i) recovering the gold from the ore using a cyanidation procedure,
   (ii) contacting any cyanidation tailings effluent with an oxidizing gas containing ozone, with the pH of the effluent being less than 7.0 during the contacting, in order to produce a hydrogen cyanide containing effluent,
   (iii) raising the pH of the effluent resulting from the contacting (ii) to a pH of at least 10.0 in order to produce a cyanide containing effluent, and
   (iv) recycling the cyanide containing effluent to the gold recovery step.

20. The method of claim 19, wherein the cyanidation tailings effluent has a copper concentration of less than 10 mg/l.

21. The method of claim 20, wherein the copper concentration in the cyanidation tailings effluent is lowered to less than 10 mg/l by contacting said effluent with an oxidizing agent.

22. The method of claim 21, wherein the oxidizing agent is hydrogen peroxide.

23. The method of claim 21, wherein ferrous or ferric cyanide is added to the cyanidation tailings prior to step (ii), followed by ferrous sulfate in order to lower the copper concentration and remove any iron cyanide.

24. The method of claim 19, wherein the oxidizing gas comprises a mixture of oxygen and ozone and oxygen is recovered after the contacting step (ii) and recycled to the gold recovery step (i).

25. The method of claim 19, wherein the oxidizing gas containing ozone comprises from about 3.0 to about 15 wt. % $O_3$.

26. The method of claim 19, wherein the contacting in (ii) takes place for a sufficient length of time to achieve at least about 80% thiocyanate conversion.

27. The method of claim 19, wherein the pH is raised to a pH of at least 10.0 by adding lime (CaO) to the effluent resulting from the contacting in (ii).

28. The method of claim 19, wherein the pH of the effluent resulting from the contacting in (ii) is less than 4.0.

29. A process for oxidizing thiocyanate in a composition to free cyanide in a column reactor, which comprises
   (i) providing a column reactor,
   (ii) adding to the column reactor an acidic composition comprising thiocyanate and an oxidizing gas containing ozone in order to oxidize the thiocyanate to HCN,
   (iii) adding lime to the column reactor in order to convert the HCN to free cyanide and produce an effluent, and
   (iv) recovering the free cyanide out of a lower portion of the column reactor.

30. The process of claim 29, wherein (ii) takes place in an upper portion of the column reactor and (iii) occurs in a lower portion of the column reactor.

31. The process of claim 29, wherein HCN gas not dissolved in the composition is captured in an alkaline composition upon removal from an upper portion of the column reactor.

32. The process of claim 31, wherein any oxygen gas in mixture with the HCN gas is recovered from the alkaline composition and recycled to a cyanidation process.

33. The process of claim 32, wherein the cyanidation process involves gold leaching.

* * * * *